Patented July 2, 1940

2,206,691

UNITED STATES PATENT OFFICE 2,206,691

LIME-ZEOLITE WATER-SOFTENING PROCESS

Reginald Furness and Harold Joseph Wheaton, Lower Walton, England, assignors to Joseph Crosfield & Sons Limited, Warrington, England, a British company No Drawing. Application October 26, 1937, Serial No. 171,070. In Great Britain November 5, 1936

5 Claims. (Cl. 210—23)

This invention relates to lime-zeolite water-softening processes.

It has frequently been suggested that a combination lime-zeolite treatment affords a useful and economic means of softening water, the lime being employed for the removal of temporary hardness, leaving the zeolite to deal with the permanent hardness. If it were successful, such a process would possess the following advantages in comparison with the use of zeolite for the removal of both temporary and permanent hardness.

(1) The cost of the softening operations would be reduced as the cost of the lime required for the removal of the temporary hardness is considerably less than that of the salt required if the zeolite process is employed for the removal of the temporary hardness.

(2) The alkalinity of the softened water would be very much lower than in the case where a zeolite is employed for the whole softening operation. With a zeolite, the calcium and magnesium bicarbonates are converted into sodium bicarbonate, the presence of which to any considerable extent in boiler water is disadvantageous for known reasons.

One major difficulty has, however, greatly obstructed the technical application of the lime-zeolite process. It has not been found possible to soften water with lime so exactly as to leave no excess of lime in the water. In addition, a lime-treated water, even after long settling to remove precipitated calcium carbonate (resulting from the action of the lime upon calcium bicarbonate present in the water) almost invariably exhibits the phenomenon of "after precipitation" or "delayed precipitation" of calcium carbonate. If, therefore, a lime-treated water be passed directly over a zeolite, the excess caustic lime results in the appearance of free caustic soda in proportionate quantities in the softened water, whilst the bed eventually becomes thoroughly choked by the deposition of calcium carbonate, the zeolite itself expediting the "after precipitation" of calcium carbonate upon itself. The deposited calcium carbonate has been known at times to bring a zeolite bed almost to the state of a solid impermeable mass and it has not been possible to remove the cementing calcium carbonate from the zeolite by means of acid treatment since the zeolites themselves are, not, in general, acid resisting.

It is an object of the present invention to avoid the above-mentioned difficulties, and it has been found that the difficulties can be practically eliminated by removing the free lime and calcium carbonate from the lime-treated water before it is passed over the zeolite.

According to the present invention a method for the softening of water comprises first treating the raw water with lime to remove temporary hardness, then passing the water over sulphonated coal as hereinafter defined to remove free lime and calcium carbonate, and finally passing the water over a zeolite which may be either a natural or synthetic product to remove the permanent hardness.

The term "sulphonated coal" is used to define the products obtained by treating bituminous coal, which term does not include lignite, or anthracite with a sulphonating agent, such as sulphuric acid or chlorosulphonic acid, until base exchange properties have developed. The production of such products is described for example in British Patent Specifications Nos. 455,374 and 450,575 where it is explained that the base exchange properties increase with an increase in the degree of sulphonation but that the treatment should not be carried too far.

In carrying out the process of the present invention it is found that particularly satisfactory results are obtained with the product (for convenience termed hereafter "granular sulphonated coal") obtained by the process described in British Patent Specification No. 455,374. According to that process coal in a granular form is treated with a sulphonating agent under the action of heat until the granules have expanded but not disintegrated, and excess acid is then removed. A specific example of the production of such granular sulphonated coal is as follows:

Coal, consisting of mixed Lancashire slacks, was crushed and the portion passing through a sieve (standard I. M. M.) having thirty meshes to the linear inch and retained on a sieve having fifty meshes to the linear inch, was treated with 7.4 times its weight of concentrated sulphuric acid (specific gravity 1.84). A temperature of 95° C. was maintained for three hours and the mixture then allowed to cool and the sulphonated coal well washed with water to remove excess acid.

Whilst the base exchange properties are characteristic of sulphonated coal, the sulphonated coal is not used in the process of the present invention for its base exchange properties but for its property of adsorbing lime and calcium carbonate. The fact that the removal of the lime and calcium carbonate is chiefly a matter of adsorption is shown by the fact that the sulphonated coal can be, and in practice preferably is, employed in the "spent" condition, that is after it has been used for the softening of water up to the point of its thorough exhaustion with calcium or magnesium salts. The "spent" sulphonated coal product adsorbs the whole of the free lime and most of the calcium carbonate, and the water passing away from the sulphonated coal contains no caustic lime, no caustic soda (since base exchange has not occurred) and a considerably reduced amount of calcium carbonate. After its passage through the bed of sulphonated coal therefore, the water may be safely passed over any type of zeolite for the final removal of permanent hardness, so that finally a treated water may be obtained which shows no "causticity," a very low alkalinity and contains no hardness-forming salts.

When after a certain period of time the bed of sulphonated coal used in the process of the present invention ceases to function at full efficiency, it may be regenerated by treatment with dilute acid (since the sulphonated coal is acid resisting) which removes adsorbed lime compounds. After washing the bed is again ready for use in the manner described above. Alternatively, if the supply of raw water contains a reasonable amount of free $CO_2$, it may be used for the regeneration of the bed, the $CO_2$ converting the adsorbed lime compounds into soluble calcium bicarbonate. The water may then be passed to the lime treatment stage so that a cyclic process is possible. In any case it is important to note that, if required, the bed may at any time be treated with mineral acid in order to cleanse it thoroughly and to remove deposited lime compound.

The following is a specific example illustrating the manner in which the method of the invention may be carried out in practice.

Example

Water containing approximately 12 parts of temporary hardness, 12 parts of permanent hardness (as parts of $CaCO_3$ per 100,000 parts of water) and a small amount of free $CO_2$ was treated with a slight excess of lime over that required theoretically to react with the bicarbonates (causing temporary hardness) and the free $CO_2$. After settling the precipitate formed, the water contained about 2 parts of free lime and 4 parts of carbonates in solution or pseudo-solution expressed in terms of $CaCO_3$ per 100,000 parts of water. The "causticity" or titration value to phenolphthalein was 4 parts per 100,000 and the "total alkalinity" or titration value to methyl orange was 6 parts per 100,000; the whole of the free lime and half the carbonates reacted with the neutralising acid in the titration at the phenolphthalein end point and the remaining half of the carbonates reacted at the methyl orange end point.

The water was then passed at a rate corresponding to normal technical practice in zeolite water-softening operations over a bed of "spent" granular sulphonated coal.

After the water had passed over the bed of "spent" granular sulphonated coal it showed no "causticity" to phenolphthalein and only 1-2 parts per 100,000 of total alkalinity to methyl orange.

In order to remove the permanent hardness, the water was then passed over a bed of zeolite when it was found that the softening was completed. The final effluent water showed zero hardness, no "causticity" and only 1-2 parts of total alkalinity (expressed as parts of calcium carbonate per 100,000 of water) actually present, presumably as sodium bicarbonate. Such a water is very suitable for boiler feed purposes.

After a considerable period of work, i. e., when the water passing from the granular sulphonated coal bed began to rise in "total alkalinity," the bed was regenerated by the passage of a raw water containing 2 parts free $CO_2$ per 100,000. In other experiments, regeneration was effected by means of weak mineral acid followed by a water wash. The bed in either event was brought into a condition for re-use for the removal of excess lime, etc., from lime-softened water and the production of an effluent water containing no "causticity" and only 1-2 parts total alkalinity.

Various changes may be made in the details disclosed in the foregoing specification without departing from the invention or sacrificing the advantages thereof.

We claim:

1. A process of water-softening comprising first treating the raw water with lime to remove temporary hardness, then passing the water over sulphonated coal to remove free lime and calcium carbonate, and finally passing the water over a zeolite softener, said sulphonated coal being obtained by treating a member of the group consisting of bituminous coal and anthracite with a sulphonating agent until base exchanging properties have developed.

2. A process of water-softening comprising first treating the raw water with lime to remove temporary hardness, then passing the water over granular sulphonated coal to remove free lime and calcium carbonate, and finally passing the water over a zeolite softener, said sulphonated coal being obtained by treating a member of the group consisting of bituminous coal and anthracite with a sulphonating agent until base exchanging properties have developed.

3. A process of softening water containing free carbon dioxide comprising regenerating sulphonated coal used for the treatment of a previous batch by passing the raw water over the sulphonated coal, then treating the water with lime to remove temporary hardness, passing the water over sulphonated coal to remove free lime and calcium carbonate, and finally passing the water over a zeolite softener, said sulphonated coal being obtained by treating a member of the group consisting of bituminous coal and anthracite with a sulphonating agent until base exchanging properties have developed.

4. A process of water-softening comprising first treating the raw water with lime to remove temporary hardness, then removing free lime and calcium carbonate by passing the water over sulphonated coal the base-exchange properties of which have been exhausted and finally passing the water over a zeolite softener, said sulphonated coal being obtained by treating a member of the group consisting of bituminous coal and anthracite with a sulphonating agent until base exchanging properties have developed.

5. A process of water-softening, comprising first treating the raw water with lime to remove temporary hardness, then contacting the water with a sufficient quantity of sulphonated coal to remove practically completely the free lime present, and finally treating the water with a zeolite softener, said sulphonated coal being obtained by treating a member of the group consisting of bituminous coal and anthracite with a sulphonating agent until base exchanging properties have developed.

REGINALD FURNESS.
HAROLD JOSEPH WHEATON.